(12) United States Patent
Tang

(10) Patent No.: US 11,553,545 B2
(45) Date of Patent: Jan. 10, 2023

(54) SESSION MANAGEMENT METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 52 days.

(21) Appl. No.: 17/142,215

(22) Filed: Jan. 5, 2021

(65) Prior Publication Data

US 2021/0127442 A1  Apr. 29, 2021

Related U.S. Application Data

(63) Continuation of application No. PCT/CN2018/096526, filed on Jul. 20, 2018.

(51) Int. Cl.
*H04W 76/15* (2018.01)
*H04W 8/24* (2009.01)
(Continued)

(52) U.S. Cl.
CPC ............ *H04W 76/15* (2018.02); *H04W 8/24* (2013.01); *H04W 80/02* (2013.01); *H04W 80/10* (2013.01); *H04W 88/06* (2013.01)

(58) Field of Classification Search
CPC ............ H04W 36/0033; H04W 76/22; H04W 60/005; H04W 80/10; H04W 28/22;
(Continued)

(56) References Cited

U.S. PATENT DOCUMENTS 11,297,551 B2 * 4/2022 Ramle .................. H04W 80/10
11,297,668 B2 * 4/2022 Kawasaki ............. H04W 76/20
(Continued)

FOREIGN PATENT DOCUMENTS

CN     102045660 A     5/2011
CN     104980980 A     10/2015
(Continued)

OTHER PUBLICATIONS

J. Ha and Y. Choi, "Support of a Multi-access Session in 5G Mobile Network," 2019 25th Asia-Pacific Conference on Communications (APCC), Nov. 2019, pp. 378-383, doi: 10.1109/APCC47188.2019. 9026455. (Year: 2019).*

(Continued)

*Primary Examiner* — William D Cumming
(74) *Attorney, Agent, or Firm* — Perkins Coie LLP

(57) ABSTRACT

A method for session method, a terminal device and a network device are provided. The method includes: sending, by a terminal device, first information to a first network device, wherein the first indication is used for requesting for establishing a packet data network (PDN) connection; receiving, by the terminal device, second information from the network device, wherein the second information indicates that the request, initiated by the terminal device, for establishing the PDN connection is accepted, the second information includes first indication information for indicating whether a protocol data unit (PDU) session corresponding to the PDN connection supports multi-access (MA) after the terminal devices moves from a $4^{th}$-generation (4G) network to a $5^{th}$-generation (5G) network, and the PDU session, if supporting the MA, is able to implement data transmission with a 3rd generation partnership project (3GPP) network and a non-3GPP network simultaneously.

16 Claims, 6 Drawing Sheets

(51) Int. Cl.
*H04W 80/02* (2009.01)
*H04W 80/10* (2009.01)
*H04W 88/06* (2009.01)

(58) Field of Classification Search
CPC . H04W 28/0268; H04W 48/20; H04W 28/24; H04W 76/20; H04W 8/08; H04W 72/0486
See application file for complete search history.

(56) References Cited

U.S. PATENT DOCUMENTS

| | | | |
|---|---|---|---|
| 2013/0021932 | A1 | 1/2013 | Damnjanovic |
| 2018/0192333 | A1* | 7/2018 | Wu ................ H04W 36/0033 |
| 2019/0357278 | A1* | 11/2019 | Kawasaki ............ H04W 76/22 |
| 2019/0357287 | A1* | 11/2019 | Kawasaki ............ H04W 64/00 |
| 2020/0112898 | A1* | 4/2020 | Ramle .................... H04W 8/08 |
| 2021/0368395 | A1* | 11/2021 | Prabhakar ............ H04W 28/24 |
| 2022/0217704 | A1* | 7/2022 | Lekutai ............ H04W 72/0486 |
| 2022/0286916 | A1* | 9/2022 | Yang .................. G06F 9/45533 |

FOREIGN PATENT DOCUMENTS

| | | | | |
|---|---|---|---|---|
| CN | 106878972 | A | 6/2017 | |
| CN | 107018542 | A | 8/2017 | |
| CN | 107431874 | A | 12/2017 | |
| CN | 107534914 | A | 1/2018 | |
| CN | 107734573 | A | 2/2018 | |
| CN | 107770824 | A | 3/2018 | |
| CN | 107820727 | A | 3/2018 | |
| CN | 107889175 | A | 4/2018 | |
| CN | 107950056 | A | 4/2018 | |
| CN | 107979860 | A | 5/2018 | |
| CN | 108141879 | A | 6/2018 | |
| CN | 108282832 | A | 7/2018 | |
| CN | 108282906 | A | 7/2018 | |
| EP | 3346762 | A1 | 7/2018 | |
| EP | 3944709 | A1 * | 1/2022 | ........ H04W 28/0268 |
| JP | 2018093252 | A | 6/2018 | |
| WO | 2018128571 | A1 | 7/2018 | |
| WO | WO-2019174545 | A1 * | 9/2019 | ........... H04L 47/803 |
| WO | WO-2020199215 | A1 * | 10/2020 | ........ H04W 28/0268 |

OTHER PUBLICATIONS

A. Kunz, L. Nkenyereye and J. Song, "5G Evolution of Cellular IoT for V2X," 2018 IEEE Conference on Standards for Communications and Networking (CSCN), 2018, pp. 1-6, doi: 10.1109/CSCN.2018.8581830. (Year: 2018).*
J. Ha and Y. -I. Choi, "Support of a Multi-access Session in 5G Mobile Network," 2019 25th Asia-Pacific Conference on Communications (APCC), 2019, pp. 378-383, doi: 10.1109/APCC47188.2019.9026455. (Year: 2019).*
ETRI, "Updating 6.2 Solution 2 to add a procedure for Multi-Access PDU Session Modification", SA WG2 Meeting #128 S2-186794, Jul. 2-6, 2018, Vilnius, Lithuania. 3 pages.
First Office Action of the Korean application No. 10-2021-7005061, dated Feb. 16, 2022. 10 pages with English translation.
Huawei, HiSilicon. "CN tunnel handling during IRAT handover", 3GPP TSG-SA WG2 Meeting #127 S2-183449, Apr. 16-20, 2018, Sanya, China. 16 pages.
Office Action of the Indian application No. 202117005693, dated Jan. 20, 2022. 7 pages with English translation.
Second Office Action of the Chinese application No. 202010555921.X, dated Dec. 1, 2021. 25 pages with English translation.
Ericsson: "POU Session IP version handling", 3GPP Draft; S2-166240 WAS6049 WAS5559 POU Session IP Version Handli NG_V6; SA WG2, Kaohsiung City, Taiwan; Oct. 17, 2016-Oct. 21, 2016 Oct. 24, 2016 (Oct. 24, 2016), XP051170161. 3 pages.
Anonymous: "3rd Generation Partnership Project; Technical Specification Group Services and System Aspects; Study on Architecture for Next Generation System (Release 14)", 3GPP Standard: Technical Report; 3GPP TR 23.799, vol. SA WG2, No. V14.0.0.Dec. 16, 2016 (Dec. 16, 2016), XP051295448. 522 pages.
Telecom Italia et al.: "Authorization of multi access PDN connectivity", 3GPP Draft; S2-090747-Multiple-PDN-Authorization, No. Phoenix; Jan. 16, 2009.Jan. 16, 2009 (Jan. 16, 2009), XP050333180. 2 pages.
Supplementary European Search Report in the European application No. 18926571.3, dated Jun. 23, 2021. 11 pages.
SA WG2 Meeting #117 S2-166241 (revision of S2-166108), Oct. 17-21, 2016, Kaohsiung, Source: Huawei, LGE, BT; Title: Solution evaluation and selection for UE simultaneously connected to 3GPP and N3GPP (sol 4.20 and 4.24). 5 pages.
First Office Action of the Chinese application No. 202010555921.X, dated Aug. 4, 2021. 28 pages.
Written Opinion of the International Search Authority in the international application No. PCT/CN2018/096526, dated Feb. 14, 2019. 6 pages.
3rd Generation Partnership Project;Technical Specification Group Services and System Aspects;System Architecture for the 5G System; Stage 2(Release 15); 3GPP TS 23.501 V15.2.0 (Jun. 2018).
3rd Generation Partnership Project;Technical Specification Group Services and System Aspects;Study on Access Traffic Steering, Switching and Splitting support in the 5G system architecture(Release 16); 3GPP TR 23.793 V0.5.0 (Jun. 2018).
International Search Report in the international application No. PCT/CN2018/096526, dated Feb. 14, 2019.
3GPP "3GPP Technical Specification Group Services and System Aspects; Procedures for the 5G System; Stage 2 (Release 15)", TS 23.502 V15.2.0 (Jun. 2018). 308 pages.
First Office Action of the Japanese application No. 2021-502834, dated Jun. 7, 2022. 8 pages with English translation.
Intel, "Solution of ATSSS rule in URSP"[online], 3GPP TSG SA WG2 #127BIS S2-185243, Jun. 1, 2018. 5 pages.
LG Electronics, "ATSSS Solution-Multi-Access PDU Session Establishment"[online], 3GPP TSG SA WG2 #126 S2-182043, Mar. 2, 2018. 8 pages with English translation.
Oppo, "New Solution: Interworking of Multi Access PDU Session"[online], 3GPP TSG SA WG2 #128BIS S2-187841. 4 pages.
Third Office Action of the Chinese application No. 202010555921.X, dated Mar. 29, 2022. 35 pages with English translation.

* cited by examiner

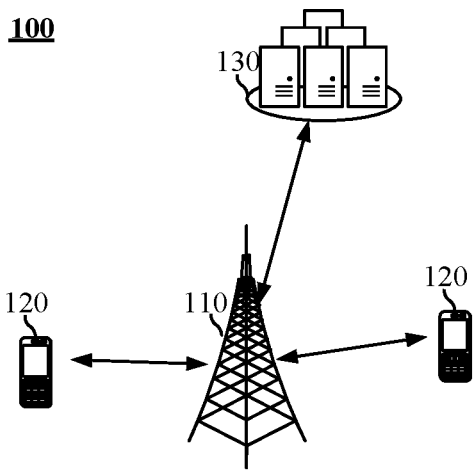

S210 — A terminal device sends first information to a first network device, wherein the first information is used for requesting for establishing a PDN connection S220 — The terminal device receives second information from the first network device, wherein the second information is used for indicating that the request, initiated by the terminal device, for establishing the PDN connection is accepted, the second information includes first indication information for indicating whether a PDU session corresponding to the PDN connection supports multi-access (MA) after the terminal device moves from a 4G network to a 5G network, and the PDU session, if supporting the MA, is able to implement data transmission with a 3rd generation partnership project (3GPP) network and a non-3GPP network simultaneously

S310 — A first network device receives first information from a terminal device, wherein the first information is used for requesting for establishing a PDN connection S320 — The first network device sends second information to the terminal device responsive to the first information, wherein the second information is used for indicating that the request, initiated by the terminal device, for establishing the PDN connection is accepted, the second information includes first indication information for indicating whether a PDU session corresponding to the PDN connection supports multi-access (MA) after the terminal device moves from a 4G network to a 5G network, and the PDU session, if supporting the MA, is able to implement data transmission with a 3rd generation partnership project (3GPP) network and a non-3GPP network simultaneously

FIG. 3

SESSION MANAGEMENT METHOD, TERMINAL DEVICE AND NETWORK DEVICE

CROSS REFERENCE TO RELATED APPLICATION

The present application is a continuation of International Application No. PCT/CN2018/096526 filed on Jul. 20, 2018, the disclosure of which is hereby incorporated by reference in its entirety.

TECHNICAL FIELD

Embodiments of the disclosure relate to the field of communications, and more particularly to a method for session management, a terminal device and a network device.

BACKGROUND

In a $5^{th}$-generation (5G) network, data may be transmitted by a multi-access (MA) technique in a protocol data unit (PDU) session. That is, a 3rd generation partnership project (3GPP) access technique (for example, Long Term Evolution (LTE) and New Radio (NR)) and a non-3GPP (a Wireless Local Area Network (WLAN)) access technique can be used at the same time. However, a $4^{th}$-generation (4G) network does not support the MA technique. When a terminal device moves from the 4G network to the 5G network, the terminal device, even though supporting the MA technique, will not use the MA technique. Therefore, how to enable a terminal device to use the MA technique when moving from the 4G network to the 5G network is a problem urgent to be solved.

SUMMARY

A method for session management, a terminal device and a network device are provided in embodiments of the disclosure.

According to a first aspect, provided is a method for session management, wherein a terminal device has established a PDN connection in a 4G network, and after the terminal device moves from the 4G network to a 5G network, the method includes: receiving, by the terminal device, first indication information from a first network device, wherein the first indication information is used for indicating whether a PDU session corresponding to the PDN connection supports multi-access (MA), and the PDU session, if supporting the MA, is able to implement data transmission with a 3rd generation partnership project (3GPP) network and a non-3GPP network simultaneously.

According to a second aspect, provided is a method for session management, wherein a terminal device has established a PDN connection in a 4G network, and after the terminal device moves from the 4G network to a 5G network, the method includes: sending, by a first network device, first indication information to the terminal device, wherein the first indication information is used for indicating whether a PDU session corresponding to the PDN connection supports multi-access (MA), and the PDU session, if supporting the MA, is able to implement data transmission with a 3rd generation partnership project (3GPP) network and a non-3GPP network simultaneously.

According to a third aspect, provided is a terminal device, including a memory and a transceiver, wherein the terminal device has established a packet data network (PDN) connection in a $4^{th}$-generation (4G) network, and after the terminal device moves from the 4G network to a $5^{th}$-generation (5G) network, the transceiver is configured to: receive first indication information from a first network device, wherein the first indication information is used for indicating whether a protocol data unit (PDU) session corresponding to the PDN connection supports multi-access (MA), and the PDU session, if supporting the MA, is able to implement data transmission with a 3rd generation partnership project (3GPP) network and a non-3GPP network simultaneously.

According to a fourth aspect, provided is a network device, including a memory and a transceiver, wherein a terminal device has established a packet data network (PDN) connection in a $4^{th}$-generation (4G) network, and after the terminal device moves from the 4G network to a $5^{th}$-generation (5G) network, the transceiver is configured to: send first indication information to the terminal device, wherein the first indication information is used for indicating whether a protocol data unit (PDU) session corresponding to the PDN connection supports multi-access (MA), and the PDU session, if supporting the MA, is able to implement data transmission with a 3rd generation partnership project (3GPP) network and a non-3GPP network simultaneously.

BRIEF DESCRIPTION OF THE DRAWINGS

FIG. 1 illustrates a schematic diagram of an architecture of a communication system according to embodiments of the disclosure.

FIG. 2 illustrates a schematic flowchart of a method for session management according to embodiments of the disclosure.

FIG. 3 illustrates a schematic flowchart of another method for session management according to embodiments of the disclosure.

DETAILED DESCRIPTION

Figure 4:
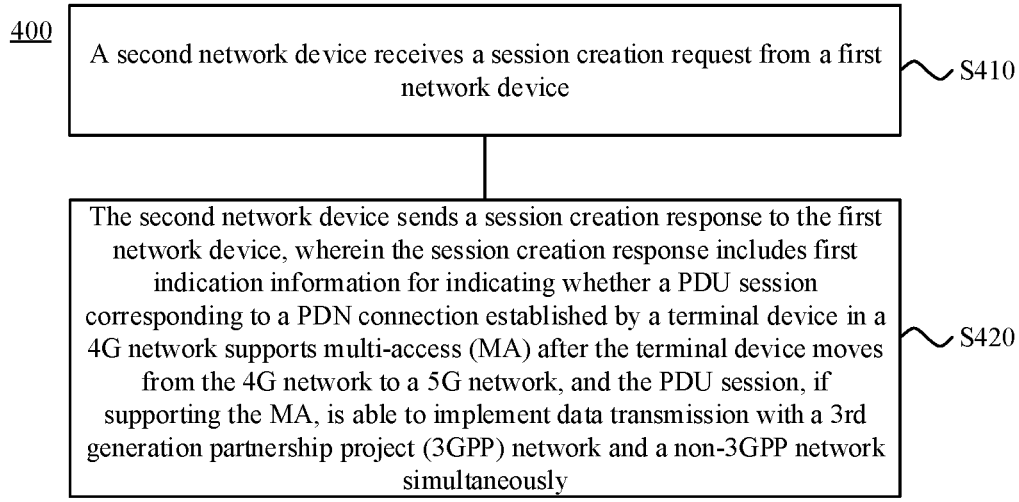
FIG. 4 illustrates a schematic flowchart of another method for session management according to embodiments of the disclosure.

The technical solutions according to the embodiments of the disclosure will be described below in conjunction with accompanying drawings in the embodiments of the disclosure. It is apparent that the described embodiments are only some of but not all embodiments the disclosure. All other embodiments obtained by those of ordinary skill in the art based on the embodiments in the disclosure without paying any creative effort shall fall within the scope of protection of the disclosure.

The technical solutions of the embodiments of the disclosure may be applied to various communication systems, for example, a global system for mobile communications (GSM), a code division multiple access (CDMA) system, a wideband code division multiple access (WCDMA) system, a general packet radio service (GPRS) system, an LTE system, an LTE frequency division duplex (FDD) system, an LTE time division duplex (TDD) system, a universal mobile telecommunication system (UMTS), a worldwide interoperability for microwave access (WiMAX) communication system, a 5G system or communication systems of future versions.

FIG. 1 illustrates a wireless communication system 100 applied in embodiments of the disclosure. The wireless communication system 100 may include an access network device 110. The access network device 110 may be a device communicating with a terminal device. The access network device 110 may provide communication coverage in a specific geographical region and may communicate with a terminal device (for example, user equipment (UE)) within the coverage.

The access network device 110 may be a base station (i.e., a gNB) in a next generation radio access network (NR RAN) or a new radio (NR) system, or may be a wireless controller in a cloud radio access network (CRAN). Alternatively, the access network device 110 may be a mobile switching center, a relay station, an access point, a vehicle-mounted device, a wearable device, a hub, a switch, a bridge, a router, a network-side device in a 5G network, a network device in a future evolved public land mobile network (PLMN) or the like. The access network device 110 may also be a base station in an LTE system, for example, an evolved universal terrestrial radio access network (E-UTRAN) device.

The wireless communication system 100 further includes at least one terminal device 120 within the coverage of the access network device 110. The terminal device 120 may be mobile or fixed. The "terminal device" as used herein includes, but is not limited to being connected via a wired line, for example, a via public switched telephone network (PSTN), a digital subscriber line (DSL), a digital cable and a direct cable connection; and/or via another data connection/network; and/or via a wireless interface, for example, for a cellular network, a wireless local area network (WLAN), a digital television network like a digital video broadcasting-handheld (DVB-H) network, a satellite network and an amplitude modulated-frequency modulated (AM-FM) broadcast transmitter, and/or via a device, configured to receive/send a communication signal, of another terminal device; and/or via an Internet of things (IoT) device. The terminal device arranged to communicate through a wireless interface may be referred to as a "wireless communication terminal", a "wireless terminal" or a "mobile terminal." Examples of a mobile terminal include, but are not limited to: a satellite phone or cell phone; a personal communication system (PCS) terminal capable of combining a cellular radio phone with data processing, faxing and data communication capabilities; a personal digital assistant (PDA) capable of including a radio phone, a pager, Internet/intranet access, a web browser, a note, a calendar, a beidou navigation satellite system (BDS) and a global positioning system (GPS) receiver; and a conventional laptop and/or handheld receiver or another electronic device including a radio telephone transceiver. The terminal device may refer to an access terminal, UE, a user unit, a user station, a mobile station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a PDA, a handheld device with a wireless communication function, a computing device or another processing device connected to a wireless modem, a vehicle-mounted device, a wearable device, a terminal device in the 5G network, a terminal device in a future evolved PLMN or the like.

The wireless communication system 100 further includes a core network device 130 communicating with the access network device. The core network device 130 may be a 5G core network device, for example, an access and mobility management function (AMF), and for another example, a session management function (SMF). The core network device 130 may also be an Evolved Packet Core (EPC) device in an LTE network. The core network device 130 may also be a combined network element, for example, an SMF+core packet gateway (SMF+PGW-C) device.

It is to be understood that the SMF+PGW-C device may realize all functions that an SMF and a PGW-C can realize.

Device to device (D2D) communication may be performed between terminal devices.

The 5G system or the 5G network may also be referred to as a new radio (NR) system or an NR network.

FIG. 1 exemplarily illustrates an access network device, a core network device and two terminal devices. The wireless communication system 100 may include multiple access network devices, and there may be another number of terminal devices within coverage of each access network device. This is not limited in the disclosure.

The wireless communication system 100 may further include another network entity, such as a mobile management entity (MME), unified data management (UDM), an Authentication Server Function (AUSF), a User Plane Function (UPF) and a signaling gateway (SGW). This is not limited in the disclosure.

It is to be understood that terms "system" and "network" herein are often used interchangeably in the disclosure. The term "and/or" herein only describes an association relationship between objects, and indicates that three relationships may exist between the objects. For example, "A and/or B" may represent three cases: A exists alone, both A and B exist, and B exists alone. In addition, the character "I" herein usually expresses an "or" association relationship between an object before the character and an object after the character.

FIG. 2 illustrates a schematic flowchart of a method 200 for session management according to embodiments of the disclosure. The method 200 includes actions S210 and S220.

In S210, a terminal device sends first information to a first network device. The first information is used for requesting for establishing a PDN connection.

It is to be understood that the first network device may be an MME.

It is to be noted that, during execution of S210, the terminal device is connected to a 4G network.

The first information may be a PDN connection establishment request.

The first information at least carries a protocol configuration option (PCO), and the PCO includes a session identifier (ID).

It is to be understood that the session ID is allocated in advance by the terminal device to a PDU session corresponding to the PDN connection.

It is to be noted that the PDU session corresponding to the PDN connection may be understood that: when the terminal device moves from the 4G network to a 5G network, the PDN connection established by the terminal device in the 4G network needs to be converted into the PDU session, and the PDN connection has the same Internet Protocol (IP) address as the PDU session.

In S220, the terminal device receives second information from the first network device. The second information is used for indicating that the request, initiated by the terminal device, for establishing the PDN connection is accepted. The second information includes first indication information for indicating whether a PDU session corresponding to the PDN connection supports multi-access (MA) after the terminal device moves from a 4G network to a 5G network. The PDU session, if supporting the MA, is able to implement data transmission with a 3rd generation partnership project (3GPP) network and a non-3GPP network simultaneously.

It is to be noted that the terminal device moving from the 4G network to the 5G network may also be understood that: the terminal device is handed over from the 4G network to the 5G network, or the terminal device moves from coverage of the 4G network to coverage of the 5G network.

The second information may be PDN connection establishment accept.

The second information at least includes a PCO, and the PCO bears the first indication information.

The first indication information may indicate, with 1 bit, whether the PDU session supports the MA. For example, when a value the bit is 0, the first indication information may indicate that the PDU session does not support MA. When the value of the bit is 1, the first indication information may indicate that the PDU session supports the MA.

It is to be noted that the 3GPP network may be such as an LTE network, an NR network and an evolved long term evolution (eLTE) network. The non-3GPP network may be a WLAN.

It is to be understood that, when data is transmitted in the non-3GPP network, the terminal device may achieve a higher transmission rate, and tariffs can be reduced. The network device may use a non-3GPP radio resource more efficiently so as to increase a transmission rate.

In embodiments of the disclosure, there may be two types of terminal devices. A first type of terminal device is pre-configured with a capability of supporting an MA PDU session. For example, the preconfiguration is stored in an SMF+PGW-C device, which means that the SMF+PGW-C device may directly determine that this type of terminal device has a capability of supporting an MA PDU session.

A second type of terminal device is not pre-configured with the capability of supporting an MA PDU session. That is to say, the second type of terminal device may have a capability of supporting an MA PDU session and may also not have a capability of supporting an MA PDU session. In other words, the second type of terminal device may determine whether to have a capability of supporting an MA PDU session according to its own practical conditions.

Specifically, as an example, in S220, the terminal device may be a first type of terminal device, which means that the second network device may determine by default that the terminal device has a capability of supporting an MA PDU session. At this time, the second network device may determine whether the PDU session supports the MA. Further, the second network device may send the second information including the first indication information to the terminal device through the first network device, such that after moving from the 4G network to the 5G network, the terminal device determines, according to the first indication information, whether to initiate creation of an MA PDU session through the non-3GPP network.

It is to be noted that, in the example, the second network device may be an SMF+PGW-C device.

Specifically, as another example, in S210, the terminal device may be a second type of terminal device. After the terminal device determines to have a capability of supporting an MA PDU session, the terminal device sends the first information including second indication information to the first network device. The second indication information is used for indicating that the terminal device has a capability of supporting an MA PDU session. Then, the first network device may send the second indication information to the second network device. After learning that the terminal device has a capability of supporting an MA PDU session, the second network device may determine whether the PDU session supports the MA. Further, the second network device may send the second information including the first indication information to the terminal device through the first network device, such that, after moving from the 4G network to the 5G network, the terminal device determines, according to the first indication information, whether to initiate creation of the MA PDU session through the non-3GPP network.

It is to be noted that, in the example, the second network device may be an SMF+PGW-C device, and the second indication information may be borne in the above PCO including the session ID.

In embodiments of the disclosure, after the terminal device moves from the 4G network to the 5G network, the terminal device determines, according to whether the PDU session supports the MA, whether to initiate creation of the MA PDU session through the non-3GPP network.

Specifically, when the PDU session supports the MA, the terminal device determines to initiate creation of the MA PDU session through the non-3GPP network. For example, the terminal device may determine to initiate creation of the MA PDU session through a WLAN.

Specifically, when the PDU session does not support the MA, the terminal device determines not to initiate creation of the MA PDU session through the non-3GPP network.

Therefore, in embodiments of the disclosure, a terminal device is informed of whether a PDU session corresponding to a PDN connection established in a 4G network supports multi-access (MA). Thus, after the terminal device moves from the 4G network to a 5G network, a non-3GPP network may be established for data transmission, if the PDU session supports the MA. As such, the terminal device may achieve a higher transmission rate, and tariffs can be reduced. The network device may use a non-3GPP radio resource more efficiently to increase a transmission rate.

FIG. 3 illustrates a schematic flowchart of a method 300 for session management according to embodiments of the disclosure. The method 300 includes actions S310 and S320.

In S310, a first network device receives first information from a terminal device. The first information is used for requesting for establishing a PDN connection.

It is to be understood that the first network device is an MME.

The first information includes second indication information for indicating that the terminal device has a capability of supporting an MA PDU session.

The first information at least carries a PCO, and the PCO includes a session ID. The second indication information may be borne in the PCO.

In S320, the first network device sends second information to the terminal device responsive to the first information. The second information is used for indicating that the request, initiated by the terminal device, for establishing the PDN connection is accepted. The second information includes first indication information for indicating whether a PDU session corresponding to the PDN connection supports multi-access (MA) after the terminal device moves from a 4G network to a 5G network. The PDU session, if supporting the MA, is able to implement data transmission with a 3rd generation partnership project (3GPP) network and a non-3GPP network simultaneously.

As an example, before S320 is executed, the method 300 further includes the following actions. The first network device sends a session creation request to a second network device. The first network device receives a session creation response from the second network device, the session creation response including the first indication information.

It is to be noted that, in the example, the second network device may be an SMF+PGW-C device, and the second network device can realize all functions of an SMF and a PGW-C.

The session creation request at least carries an ID of the terminal device and the PCO carried in the first information.

In the example, the terminal device may be a first type of terminal device, which means that the second network device may determine by default that the terminal device has a capability of supporting an MA PDU session. At this time, after the second network device receives the session creation request, the second network device may determine whether an MA property is available for the PDU session according to an access point name (APN) and a local configuration (which may be, for example, service configuration information). If the MA property is available for the PDU session, it is determined that the PDU session may support MA. If the MA property is unavailable for the PDU session, it is determined that the PDU session may not support MA. Further, the second network device may indicate, through the first indication information contained in the session creation response, whether the PDU session supports the MA.

In the example, the session creation response at least includes a PCO, and the PCO carries the first indication information.

As another example, before S320 is executed, the method 300 further includes the following actions. The first network device sends a session creation request to the second network device, the session creation request including the second indication information. The first network device receives a session creation response from the second network device, the session creation response including the first indication information.

It is to be noted that, in the example, the second network device may also be an SMF+PGW-C device.

The session creation request at least carries an ID of the terminal device and the PCO carried in the first information, and the PCO includes the second indication information.

In the example, the terminal device may be a second type of terminal device. The first network device indicates, in the session creation request, that the terminal device has a capability of supporting an MA PDU session. After the second network device receives the session creation request, the second network device may determine whether an MA property is available for the PDU session according to an APN and a local configuration (which may be, for example, service configuration information). If the MA property is available for the PDU session, it is determined that the PDU session may support MA. If the MA property is unavailable for the PDU session, it is determined that the PDU session may not support MA. Further, the second network device may indicate, through the first indication information contained in the session creation response, whether the PDU session supports the MA.

In the example, the session creation response at least includes a PCO, and the PCO carries the first indication information.

It is to be noted that the APN may be reported by the terminal device and may also be a default APN, subscribed by the terminal device, selected by the first network device.

In the example, the first network device may select, according to the APN, a combined network element (e.g., an SMF+PGW-C device) as the second network device for the terminal device.

It is to be understood that the actions in the method 300 for session management may refer to the corresponding actions in the method 200 for session management, which will not be elaborated herein for simplicity.

Therefore, in embodiments of the disclosure, a first network device may inform a terminal device of whether a PDU session corresponding to a PDN connection established in a 4G network supports multi-access (MA). After the terminal device moves from the 4G network to a 5G network, a non-3GPP network may be established for data transmission, if the PDU session supports the MA. As such, the terminal device may achieve a higher transmission rate, and tariffs can be reduced. The network device may use a non-3GPP radio resource more efficiently to increase a transmission rate.

FIG. 4 illustrates a schematic flowchart of a method 400 for session management according to embodiments of the disclosure. The method 400 includes actions S410 and S420.

In S410, a second network device receives a session creation request from a first network device.

It is to be understood that the second network device may be an SMF+PGW-C device, and the first network device may be an MME.

The session creation request at least carries an ID of the terminal device, an APN and a PCO.

Specifically, the second network device may determine whether an MA property is available for a PDU session according to the APN and a local configuration (which may be, for example, service configuration information). If the MA property is available for the PDU session, it is determined that the PDU session may support MA. If the MA property is unavailable for the PDU session, it is determined that the PDU session may not support MA.

In S420, the second network device sends a session creation response to the first network device. The session creation response includes first indication information for indicating whether a PDU session corresponding to a PDN connection established by a terminal device in a 4G network supports multi-access (MA) after the terminal device moves from the 4G network to a 5G network. The PDU session, if supporting the MA, is able to implement data transmission with a 3rd generation partnership project (3GPP) network and a non-3GPP network simultaneously.

The session creation response at least includes a PCO, and the PCO carries the first indication information.

In embodiments of the application, the session creation request includes second indication information for indicating that the terminal device has a capability of supporting an MA PDU session.

Specifically, the second indication information may be borne in the PCO in the session creation request.

It is to be understood that the actions in the method 400 for session management may refer to the corresponding actions in the method 200 for session management and the method 300 for session management, which will not be elaborated herein for simplicity.

Therefore, in embodiments of the application, a second network device may determine and inform, through a first network device, a terminal device of whether a PDU session corresponding to a PDN connection established by the terminal device in a 4G network supports multi-access (MA). After the terminal device moves from the 4G network to a 5G network, a non-3GPP network may be established for data transmission, if the PDU session supports the MA. As such, the terminal device may achieve a higher transmission rate, tariffs can be reduced. The network device may use a non-3GPP radio resource more efficiently to increase a transmission rate.

Figure 5:
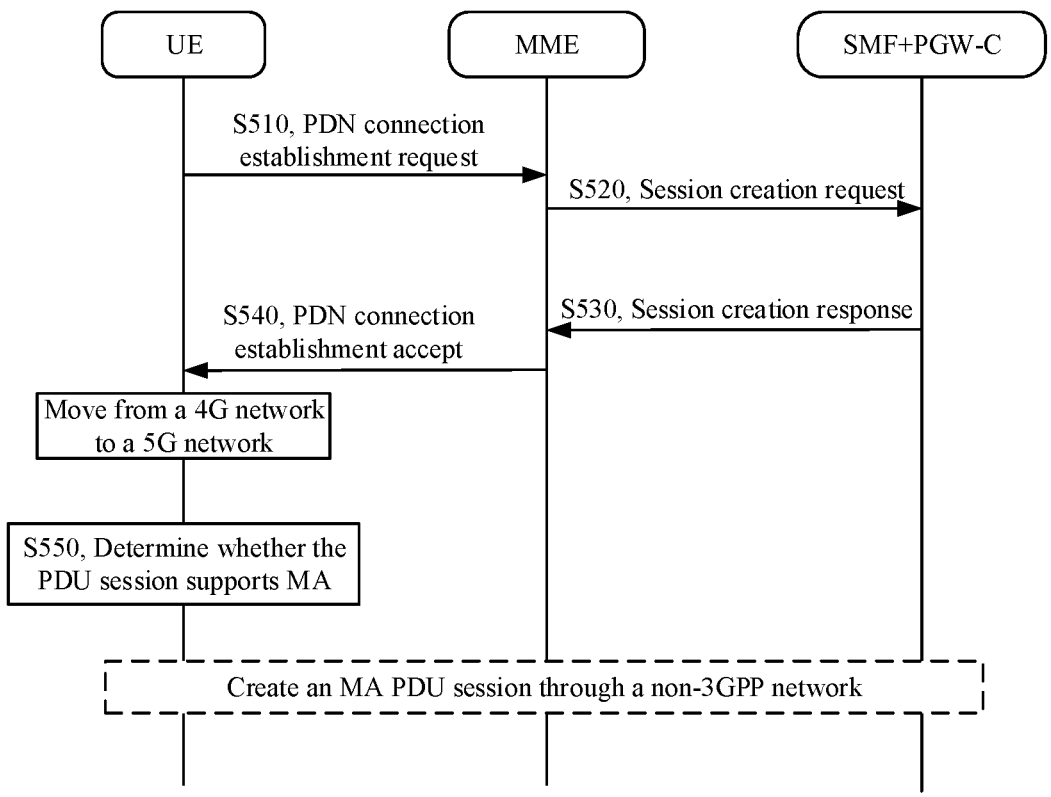
FIG. 5 illustrates a schematic flowchart of session management according to embodiments of the disclosure.

As an embodiment, a method 500 as illustrated in FIG. 5 includes the following actions.

In S510, UE sends a PDN connection establishment request to an MME in a 4G network.

Specifically, the PDN connection establishment request carries an APN and a PCO. The PCO includes indication information A, besides a session ID, and the indication information A is used for indicating that the terminal device has a capability of supporting an MA PDU session.

It is to be understood that the PDN connection establishment request is used for requesting or establishing a PDN connection.

It is to be noted that the session ID is an ID allocated in advance by the terminal device to a PDU session corresponding to the PDN connection after handover to a 5G network.

In S520, the MME sends a session creation request to an SMF+PGW-C device.

Specifically, the session creation request carries a UE ID, and the APN and the PCO received in S510.

It is to be noted that the MME knows that the UE supports both the 4G network and the 5G network, and the MME selects a combined SMF+PGW-C device for the UE according to the APN. If the PDN connection establishment request in S510 does not carry the APN, the MME selects a default APN subscribed by the UE.

It is to be understood that the SMF+PGW-C device may all functions of an SMF and a PGW-C.

In S530, the SMF+PGW-C device determines whether a PDU session corresponding to the PDN connection supports MA, and the SMF+PGW-C device feeds back a session creation response to the MME.

Specifically, the SMF+PGW-C device may determine, according to the APN, the indication information A and a local configuration, whether an MA property is available for the PDU session corresponding to the PDN connection after the UE moves from the 4G network to the 5G network. If the MA property is available for the PDU session, it is determined that the PDU session may support the MA. If the MA property is unavailable for the PDU session, it is determined that the PDU session may not support the MA.

The SMF+PGW-C device may carry a PCO in the session creation response. The PCO carries indication information B. The indication information B is used for indicating whether the PDU session supports the MA.

The indication information B may indicate, with 1 bit, whether the PDU session supports the MA. For example, when the value of the bit is 0, the indication information B may indicate that the PDU session does not support the MA. When the value of the bit is 1, the indication information B may indicate that the PDU session supports the MA.

In S540, the MME returns PDN connection establishment accept to the UE.

Specifically, the PDN connection establishment accept includes a PCO determined by the SMF+PGW-C device, and the PCO is the PCO carried in the session creation response in S530.

In S550, after the UE moves from the 4G network to a 5G network, the UE determines, according to second indication information, whether the PDU session supports the MA.

Specifically, when the PDU session supports the MA, the UE determines to initiate creation of an MA PDU session through a non-3GPP network.

Figure 6:
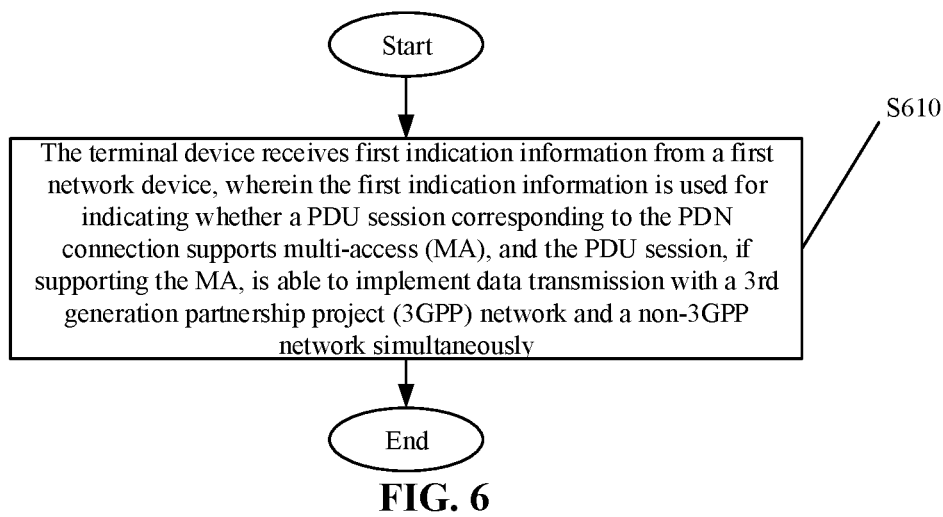
FIG. 6 illustrates a schematic flowchart of another method for session management according to embodiments of the disclosure.

FIG. 6 illustrates a schematic flowchart of a method 600 for session management according to embodiments of the disclosure. In the method 600, a terminal device has established a PDN connection in a 4G network, and after the terminal device moves from the 4G network to a 5G network, the method 600 includes action S610.

In S610, the terminal device receives first indication information from a first network device. The first indication information is used for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

In embodiments of the disclosure, the first network device may be an AMF. In such case, S610 may be executed in a PDU session modification stage.

Specifically, the terminal device sends first information to the first network device. The first information is used for requesting for modifying the PDU session.

The terminal device receives second information from the first network device. The second information is used for indicating that the request, initiated by the terminal device, for modifying the PDU session is accepted. The second information includes the first indication information.

It is to be noted that, after the terminal device moves from the 4G network to the 5G network, if the terminal device has a capability of supporting an MA PDU session, it is necessary to initiate PDU session modification for each PDU session transferred to the 5G network.

In embodiments of the disclosure, there may be two types of terminal devices. A first type of terminal device is pre-configured with a capability of supporting an MA PDU session. For example, the preconfiguration is stored in an SMF+PGW-C device, which means that the SMF+PGW-C device may directly determine that this type of terminal device has a capability of supporting an MA PDU session. A second type of terminal device is not pre-configured with the capability of supporting an MA PDU session. That is to say, the second type of terminal device may have a capability of supporting an MA PDU session and may also not have a capability of supporting an MA PDU session. In other words, the terminal device of the second type may determine whether to have a capability of supporting an MA PDU session according to its own practical conditions.

Specifically, as an example, the terminal device may be a first type of terminal device. That is to say, the second network device may determine by default that the terminal device has a capability of supporting an MA PDU session. At this time, the second network device may determine whether the PDU session supports the MA. Further, after the terminal device sends the first information to the first network device and the first network device sends a session creation request to the second terminal device, the second network device may send, through the first network device, the second information including the first indication information to the terminal device, such that the terminal device determines, according to the first indication information, whether to initiate creation of an MA PDU session through the non-3GPP network.

Specifically, as another example, the terminal device may be a second type of terminal device. After the terminal device determines to have a capability of supporting an MA PDU session, the terminal device sends the first information including second indication information to the first network device. The second indication information is used for indicating that the terminal device has a capability of supporting an MA PDU session. Then the first network device may send the second indication information to the second network device. After learning that the terminal device has a capability of supporting an MA PDU session, the second network device may determine whether the PDU session supports the MA. Further, the second network device may send, through the first network device, the second information including the first indication information to the terminal device, such that the terminal device determines, according to the first indication information, whether to initiate creation of the MA PDU session through the non-3GPP network.

In embodiments of the disclosure, the first network device may also be a policy control function (PCF), and in such case, S610 may specifically be the following action. The terminal device receives third information from the first network device. The third information is used for indicating an access technology steering switching splitting (ATSSS) policy, and the third information includes the first indication information.

In such case, the third information may be a non-access stratum (NAS) message.

In embodiments of the disclosure, the terminal device determines, according to whether the PDU session supports the MA, whether to initiate creation of the MA PDU session through the non-3GPP network.

Specifically, when the PDU session supports the MA, the terminal device determines to initiate creation of the MA PDU session through the non-3GPP network. For example, the terminal device may determine to initiate creation of the MA PDU session through a WLAN.

Specifically, when the PDU session does not support the MA, the terminal device determines not to initiate creation of the MA PDU session through the non-3GPP network.

It is to be understood that the actions in the method 600 for session management may refer to the corresponding actions in the method 200 for session management, which will not be elaborated herein for simplicity.

Therefore, in embodiments of the disclosure, a terminal device is informed of whether a PDU session corresponding to a PDN connection established in a 4G network supports the MA. After the terminal device moves from the 4G network to a 5G network, a non-3GPP network may be established for data transmission, if the PDU session supports the MA. The terminal device may achieve a higher transmission rate, and tariffs can be reduced. The network device may use a non-3GPP radio resource more efficiently to increase a transmission rate.

Figure 7:
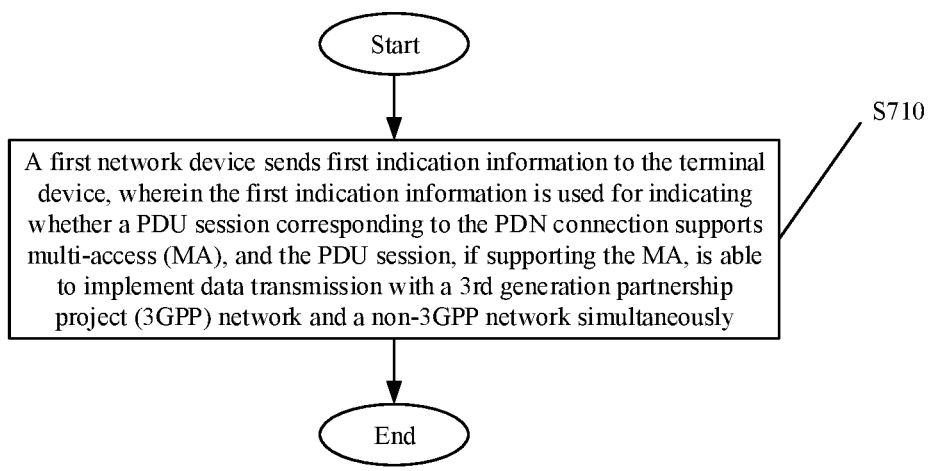
FIG. 7 illustrates a schematic flowchart of another method for session management according to embodiments of the disclosure.

FIG. 7 illustrates a schematic flowchart of a method 700 for session management according to embodiments of the disclosure. In the method 700, a terminal device has established a PDN connection in a 4G network, and after the terminal device moves from the 4G network to a 5G network, the method 700 includes action S710.

In S710, a first network device sends first indication information to the terminal device. The first indication information is used for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

In embodiments of the disclosure, the first network device is an AMF.

Specifically, before the first network device sends the first indication information to the terminal device, the method 700 further includes the following action. The first network device receives first information from the terminal device. The first information is used for requesting for modifying the PDU session. The action that the first network device sends the first indication information to the terminal device includes the action that the first network device sends second information to the terminal device. The second information is used for indicating that the request, initiated by the terminal device, for modifying the PDU session is accepted, and the second information includes the first indication information.

It is to be noted that the first information may include a session ID.

The first information includes second indication information for indicating that the terminal device has a capability of supporting an MA PDU session.

Before the first network device sends the second information to the terminal device, the method 700 further includes the following actions. The first network device sends a context update request for the terminal device to a second network device. The first network device receives a context update response for the terminal device from the second network device, the context update response including the first indication information.

It is to be noted that the second network device is an SMF+PGW-C device.

The context update request at least includes a UE ID and the session ID.

Before the first network device sends the second information to the terminal device, the method 700 further includes the following actions. The first network device sends a context update request for the terminal device to the second network device, the context update request including second indication information. The first network device receives a context update response for the terminal device from the second network device, the context update response including the first indication information.

In embodiments of the disclosure, the first network device is a policy control function (PCF).

Specifically, the action that the first network device sends the first indication information to the terminal device includes the action that the first network device sends third information to the terminal device. The third information is used for indicating an ATSSS policy, and the third information includes the first indication information.

It is to be understood that the actions in the method 700 for session management may refer to the corresponding actions in the method 600 for session management, which will not be elaborated herein for simplicity.

Therefore, in embodiments of the disclosure, after a terminal device moves from a 4G network to a 5G network, the terminal device is informed of whether a PDU session corresponding to a PDN connection established by the terminal device in the 4G network supports the MA. If the PDU session supports the MA, a non-3GPP network may be established for data transmission. The terminal device may achieve a higher transmission rate, and tariffs can be reduced. The network device may use a non-3GPP radio resource more efficiently to increase a transmission rate.

Figure 8:
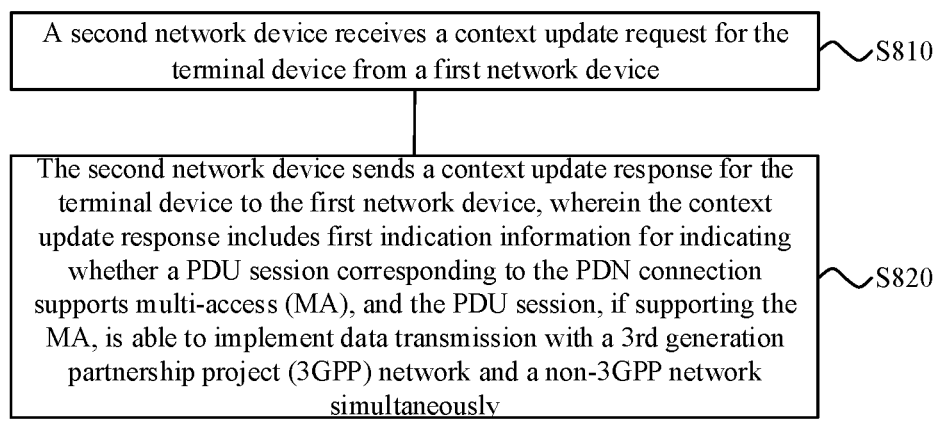
FIG. 8 illustrates a schematic flowchart of a further method for session management according to embodiments of the disclosure.

FIG. 8 illustrates a schematic flowchart of a method 800 for session management according to embodiments of the disclosure. In the method 800, a terminal device has established a PDN connection in a 4G network, and after the terminal device moves from the 4G network to a 5G network, the method 800 includes actions S810 and S820.

In S810, a second network device receives a context update request for the terminal device from a first network device.

It is to be understood that the first network device is an AMF and the second network device is an SMF+PGW-C device.

In S820, the second network device sends a context update response for the terminal device to the first network device. The context update response includes first indication information for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

The context update request includes second indication information for indicating that the terminal device has a capability of supporting an MA PDU session.

The action that the second network device sends the context update response for the terminal device to the first network device includes the action that: after receiving the second indication information, the second network device determines whether the PDU session supports the MA, and sends the context update response to the first network device.

It is to be understood that the actions in the method 800 for session management may refer to the corresponding actions in the method 600 for session management and the method 700 for session management, which will not be elaborated herein for simplicity.

Therefore, in embodiments of the disclosure, a second network device may determine and inform, through a first network device, a terminal device of whether a PDU session corresponding to a PDN connection established by the terminal device in a 4G network supports the MA. When the terminal device determines that the PDU session supports the MA, a non-3GPP network may be established for data transmission. Thus, the terminal device may achieve a higher transmission rate, and tariffs can be reduced. The network device may use a non-3GPP radio resource more efficiently to increase a transmission rate.

Figure 9:
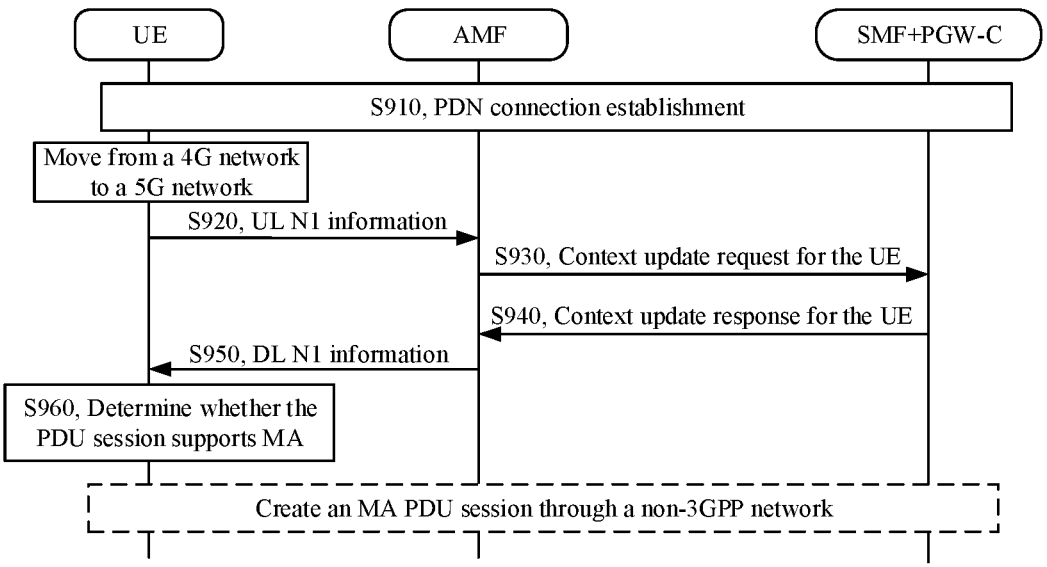
FIG. 9 illustrates another schematic flowchart of session management according to embodiments of the disclosure.

As an embodiment, a method 900 as illustrated in FIG. 9 includes the following actions.

In S910, UE establishes a PDN connection in a 4G network.

In S920, after the UE moves from the 4G network to a 5G network, the UE sends an uplink (UL) N1 message to an AMF.

It is to be understood that N1 is an interface between the UE and the AMF.

It is to be noted that the UE, if having a capability of supporting an MA PDU session, needs to initiate PDU session modification for each PDU session transferred to the 5G network.

It is to be understood that, after the UE moves from the 4G network to the 5G network, each PDN connection established by the UE in the 4G network is transferred into the 5G network as a PDU session.

Specifically, the UL N1 message includes a session ID and a PDU session modification request. The PDU session modification request further includes indication information 1, and the indication information 1 is used for indicating that the UE has a capability of supporting an MA PDU session.

In S930, the AMF sends a context update request for the UE to an SMF+PGW-C device.

Specifically, the context update request at least includes a UE ID, the session ID, and the PDU session modification request includes the indication information 1.

The AMF may also invoke a UE context update request (Nsmf_UpdateUEContext Request) service to implement S930.

It is to be noted that the Nsmf is an interface between the AMF and the SMF+PGW-C device.

In S940, the SMF+PGW-C device sends a context update response for the UE to the AMF.

Specifically, the context update response at least includes the UE ID, the session ID, and PDU session modification accept. The PDU session modification accept includes indication information 2. The indication information 2 is used for indicating whether the PDU session supports the MA.

The indication information 2 may indicate, with 1 bit, whether the PDU session supports the MA. For example, when the value of the bit is 0, the indication information 2 may indicate that the PDU session does not support the MA. When the value of the bit is 1, the indication information 2 may indicate that the PDU session supports the MA.

The SMF+PGW-C device learns, according to the indication information 1, that the UE has a capability of supporting an MA PDU session, then determines, according to a local configuration, whether the PDU session supports the MA, and places a determination result in the PDU session modification accept.

The SMF+PGW-C device may also invoke a UE context update response (Nsmf_UpdateUEContext Response) service to implement S940.

In S950, the AMF sends a downlink (DL) N1 message to the UE.

Specifically, the DL N1 message at least includes the session ID and the PDU session modification accept. The PDU session modification accept further includes the indication information 2.

In S960, the UE determines, according to the second indication information, whether the PDU session supports the MA.

Specifically, when the PDU session supports the MA, the UE determines to initiate creation of an MA PDU session through a non-3GPP network.

Figure 10:
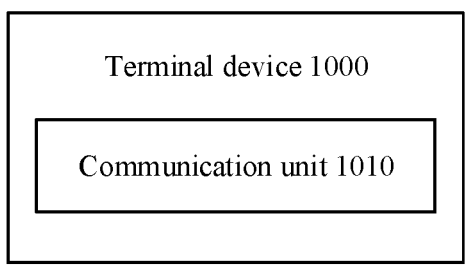
FIG. 10 illustrates a schematic block diagram of a terminal device according to embodiments of the disclosure.

FIG. 10 illustrates a schematic block diagram of a terminal device 1000 according to embodiments of the disclosure. As illustrated in FIG. 10, the terminal device 1000 includes a communication unit 1010.

The communication unit 1010 is configured to send first information to a first network device. The first information is used for requesting for establishing a PDN connection.

The communication unit 1010 is further configured to receive second information from the first network device. The second information is used for indicating that the request, initiated by the terminal device, for establishing the PDN connection is accepted. The second information includes first indication information for indicating whether a PDU session corresponding to the PDN connection supports multi-access (MA) after the terminal device moves from a 4G network to a 5G network. The PDU session, if supporting the MA, is able to implement data transmission with a 3rd generation partnership project (3GPP) network and a non-3GPP network simultaneously.

The first information includes second indication information for indicating that the terminal device has a capability of supporting an MA PDU session.

The terminal device 1000 further includes a processing unit 1020.

The processing unit 1020 is configured to: after the terminal device moves from the 4G network to the 5G network, determine, according to whether the PDU session supports the MA, whether to initiate creation of an MA PDU session through the non-3GPP network.

The processing unit 1020 is specifically configured to: when the PDU session supports the MA, determine to initiate creation of the MA PDU session through the non-3GPP network; or when the PDU session does not support the MA, determine not to initiate creation of the MA PDU session through the non-3GPP network.

It is to be understood that the abovementioned and other operations and/or functions of modules in the terminal device 1000 according to embodiments of the disclosure are intended to implement the corresponding processes executed by the terminal device in the method 200 in FIG. 2 respectively, which will not be elaborated herein for simplicity.

Figure 11:
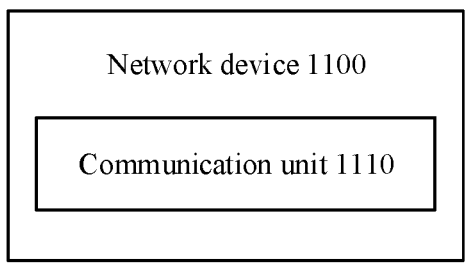
FIG. 11 illustrates a schematic block diagram of a network device according to embodiments of the disclosure.

FIG. 11 illustrates a schematic block diagram of a network device 1100 according to embodiments of the disclosure. As illustrated in FIG. 11, the network device 1100 includes a communication unit 1110.

The communication unit 1110 is configured to receive first information from a terminal device. The first information is used for requesting for establishing a PDN connection.

The communication unit 1110 is further configured to send second information to the terminal device responsive to the first information. The second information is used for indicating that the request, initiated by the terminal device, for establishing the PDN connection is accepted. The second information includes first indication information for indicating whether a PDU session corresponding to the PDN connection supports multi-access (MA) after the terminal device moves from a 4G network to a 5G network. The PDU session, if supporting the MA, is able to implement data transmission with a 3rd generation partnership project (3GPP) network and a non-3GPP network simultaneously.

The first information includes second indication information for indicating that the terminal device has a capability of supporting an MA PDU session.

Before the communication unit 1110 sends the second information to the terminal device, the communication unit 1110 is further configured to: send a session creation request to a second network device; and receive a session creation response from the second network device, the session creation response including the first indication information.

Before the communication unit 1110 sends the second information to the terminal device, the communication unit 1110 is further configured to: send a session creation request to a second network device, the session creation request including the second indication information; and receive a session creation response from the second network device, the session creation response including the first indication information.

It is to be understood that the abovementioned and other operations and/or functions of modules in the network device 1100 according to embodiments of the disclosure are intended to implement the corresponding processes executed by the network device in the method 300 in FIG. 3 respectively, which will not be elaborated herein for simplicity.

Figure 12:
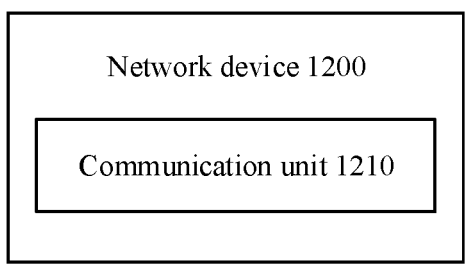
FIG. 12 illustrates a schematic block diagram of another network device according to embodiments of the disclosure.

FIG. 12 illustrates a schematic block diagram of a network device 1200 according to embodiments of the disclosure. As illustrated in FIG. 12, the network device 1200 includes a communication unit 1210.

The communication unit 1210 is configured to receive a session creation request from a first network device.

The communication unit 1210 is further configured to send a session creation response to the first network device. The session creation response includes first indication information for indicating whether a PDU session corresponding to a PDN connection established by a terminal device in a 4G network supports multi-access (MA) after the terminal device moves from the 4G network to a 5G network. The PDU session, if supporting the MA, is able to implement data transmission with a 3rd generation partnership project (3GPP) network and a non-3GPP network simultaneously.

The session creation request includes second indication information for indicating that the terminal device has a capability of supporting an MA PDU session.

The network device 1200 further includes a processing unit 1220.

The processing unit 1220 is configured to: after the communication unit 1210 receives the second indication information, determine whether the PDU session supports the MA and control the communication unit 1210 to send the session creation response to the first network device.

It is to be understood that the abovementioned and other operations and/or functions of modules in the network device 1200 according to embodiments of the disclosure are intended to implement the corresponding processes executed by the network device in the method 400 in FIG. 4 respectively, which will not be elaborated herein for simplicity.

Figure 13:
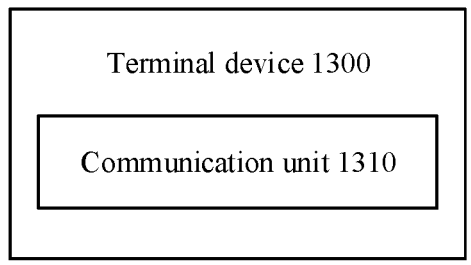
FIG. 13 illustrates a schematic block diagram of another terminal device according to embodiments of the disclosure.

FIG. 13 illustrates a schematic block diagram of a terminal device 1300 according to embodiments of the disclosure. As illustrated in FIG. 13, the terminal device 1300 includes a communication unit 1310.

The terminal device 1300 has established a PDN connection in a 4G network, and after the terminal device 1300 moves from the 4G network to a 5G network, the communication unit 1310 is configured to receive first indication information from a first network device. The first indication information is used for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

Before the communication unit 1310 receives the first indication information from the first network device, the communication unit 1310 is further configured to send first information to the first network device. The first information is used for requesting for modifying the PDU session.

The communication unit 1310 is specifically configured to: receive second information from the first network device. The second information is used for indicating that the request, initiated by the terminal device, for modifying the PDU session is accepted, and the second information includes the first indication information.

The first information includes second indication information for indicating that the terminal device has a capability of supporting an MA PDU session.

The communication unit 1310 is specifically configured to: receive third information from the first network device. The third information is used for indicating an ATSSS policy, and the third information includes the first indication information.

The terminal device 1300 further includes a processing unit 1320.

The processing unit 1320 is configured to determine, according to whether the PDU session supports the MA, whether to initiate creation of an MA PDU session through the non-3GPP network.

The processing unit 1320 is specifically configured to: when the PDU session supports the MA, determine to initiate creation of the MA PDU session through the non-3GPP network; or when the PDU session does not support the MA, determine not to initiate creation of the MA PDU session through the non-3GPP network.

It is to be understood that the abovementioned and other operations and/or functions of modules in the terminal device 1300 according to embodiments of the disclosure are intended to implement the corresponding processes executed by the terminal device in the method 600 in FIG. 6 respectively, which will not be elaborated herein for simplicity.

Figure 14:
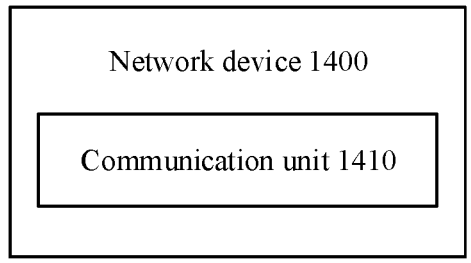
FIG. 14 illustrates a schematic block diagram of another network device according to embodiments of the disclosure.

FIG. 14 illustrates a schematic block diagram of a network device 1400 according to embodiments of the disclosure. As illustrated in FIG. 14, the network device 1400 includes a communication unit 1410.

The network device 1400 serves for a terminal device. The terminal device has established a PDN connection in a 4G network, and after the terminal device moves from the 4G network to a 5G network, the communication unit 1410 is configured to send first indication information to the terminal device. The first indication information is used for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

Before the communication unit 1410 sends the first indication information to the terminal device, the communication unit 1410 is further configured to receive first information from the terminal device. The first information is used for requesting for modifying the PDU session.

The communication unit 1410 is specifically configured to: send second information to the terminal device. The second information is used for indicating that the request, initiated by the terminal device, for modifying the PDU session is accepted, and the second information includes the first indication information.

The first information includes second indication information for indicating that the terminal device has a capability of supporting an MA PDU session.

Before the communication unit 1410 sends the second information to the terminal device, the communication unit 1410 is further configured to: send a context update request for the terminal device to a second network device; and receive a context update response for the terminal device from the second network device, the context update response including the first indication information.

Before the communication unit 1410 sends the second information to the terminal device, the communication unit 1410 is further configured to: send a context update request for the terminal device to the second network device, the context update request including the second indication information; and receive a context update response for the terminal device from the second network device, the context update response including the first indication information.

The communication unit 1410 is specifically configured to: send third information to the terminal device. The third information is used for indicating an ATSSS policy, and the third information includes the first indication information.

It is to be understood that the abovementioned and other operations and/or functions of modules in the network device 1400 according to embodiments of the disclosure are intended to implement the corresponding processes executed by the network device in the method 700 in FIG. 7 respectively, which will not be elaborated herein for simplicity.

Figure 15:
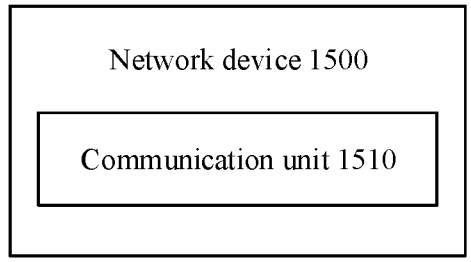
FIG. 15 illustrates a schematic block diagram of a further network device according to embodiments of the disclosure.

FIG. 15 illustrates a schematic block diagram of a network device 1500 according to embodiments of the disclosure. As illustrated in FIG. 15, the network device 1500 includes a communication unit 1510.

The network device 1500 serves for a terminal device. The terminal device has established a PDN connection in a 4G network, and after the terminal device moves from the 4G network to a 5G network, the communication unit 1510 is configured to receive a context update request for the terminal device from a first network device.

The communication unit 1510 is further configured to send a context update response for the terminal device to the first network device. The context update response includes first indication information for indicating whether a PDU session corresponding to the PDN connection supports multi-access (MA). The PDU session, if supporting the MA, is able to implement data transmission with a 3rd generation partnership project (3GPP) network and a non-3GPP network simultaneously.

The context update request includes second indication information for indicating that the terminal device has a capability of supporting an MA PDU session.

The network device 1500 further includes a processing unit 1520.

The processing unit 1520 is configured to: after the communication unit 1510 receives the second indication information, determine whether the PDU session supports the MA and control the communication unit 1510 to send the context update response to the first network device.

It is to be understood that the abovementioned and other operations and/or functions of modules in the network device 1500 according to embodiments of the disclosure are intended to implement the corresponding processes executed by the network device in the method 800 in FIG. 8 respectively, which will not be elaborated herein for simplicity.

Figure 16:
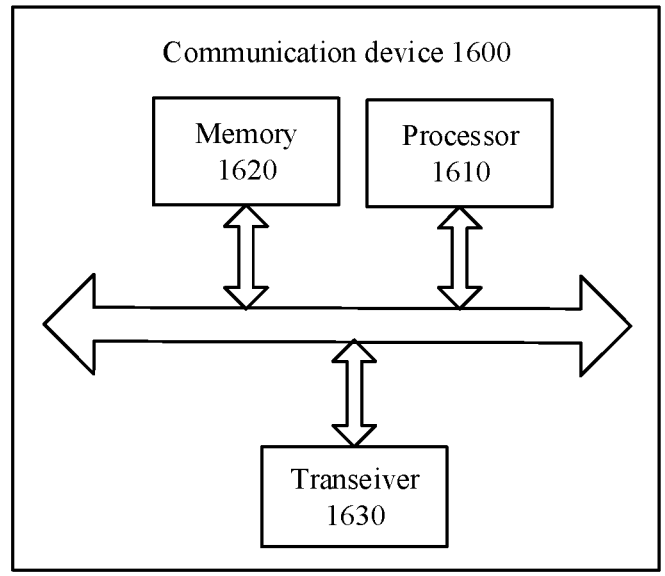
FIG. 16 illustrates a schematic block diagram of a communication device according to embodiments of the disclosure.

FIG. 16 illustrates a schematic structural diagram of a communication device 1600 according to embodiments of the disclosure. The communication device 1600 illustrated in FIG. 16 includes a processor 1610, and the processor 1610 may invoke and run a computer program in a memory to implement any method according to the embodiments of the disclosure.

As illustrated in FIG. 16, the communication device 1600 may further include the memory 1620. The processor 1610 may invoke and run a computer program in the memory 1620 to implement any of the methods according to the embodiments of the disclosure.

The memory 1620 may be a discrete device independent of the processor 1610 and may also be integrated into the processor 1610.

As illustrated in FIG. 16, the communication device 1600 may further include a transceiver 1630, and the processor 1610 may control the transceiver 1630 to communicate with another device, specifically sending information or data to another device or receiving information or data from another device.

The transceiver 1630 may include a transmitter and a receiver. The transceiver 1630 may further include one or more antennae.

The communication device 1600 may specifically be a network device according to the embodiments of the disclosure. The communication device 1600 may implement corresponding processes implemented by a network device in any of the methods according to the embodiments of the disclosure, which will not be elaborated here for simplicity.

The communication device 1600 may specifically be the mobile terminal/terminal device according to the embodiments of the disclosure. The communication device 1600 may implement corresponding processes implemented by a mobile terminal/terminal device in any of the methods according to the embodiments of the disclosure, which will not be elaborated here for simplicity.

Figure 17:
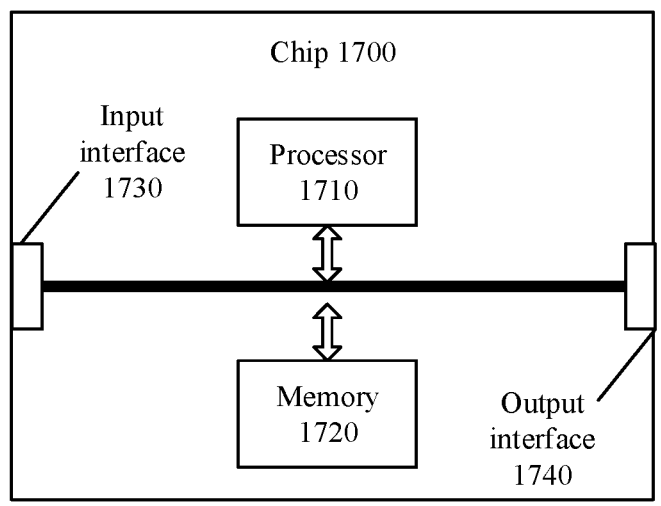
FIG. 17 illustrates a schematic block diagram of a chip according to embodiments of the disclosure.

FIG. 17 illustrates a schematic structural diagram of a chip according to embodiments of the disclosure. The chip 1700 illustrated in FIG. 17 includes a processor 1710, and the processor 1710 may invoke and run a computer program in a memory to implement any of the methods according to the embodiments of the disclosure.

As illustrated in FIG. 17, the chip 1700 may further include a memory 1720. The processor 1710 may invoke and run a computer program in the memory 1720 to implement any of the methods according to the embodiments of the disclosure.

The memory 1720 may be a discrete device independent of the processor 1710 and may also be integrated into the processor 1710.

The chip 1700 may further include an input interface 1730. The processor 1710 may control the input interface 1730 to communicate with another device or chip, specifically acquiring information or data from another device or chip.

The chip 1700 may further include an output interface 1740. The processor 1710 may control the output interface 1740 to communicate with another device or chip, specifically outputting information or data to another device or chip.

The chip may be applied to the network device according to the embodiments of the disclosure, and the chip may implement corresponding processes implemented by a network device in any of the methods according to embodiments of the disclosure, which will not be elaborated here for simplicity.

The chip may be applied to the mobile terminal/terminal device according to the embodiments of the disclosure. The chip may implement corresponding processes implemented by a mobile terminal/terminal device in any of the methods according to the embodiments of the disclosure, which will not be elaborated here for simplicity.

It is to be understood that the chip mentioned in the embodiments of the disclosure may also be referred to as a system-level chip, a system chip, a chip system or a system on chip, etc.

Figure 18:
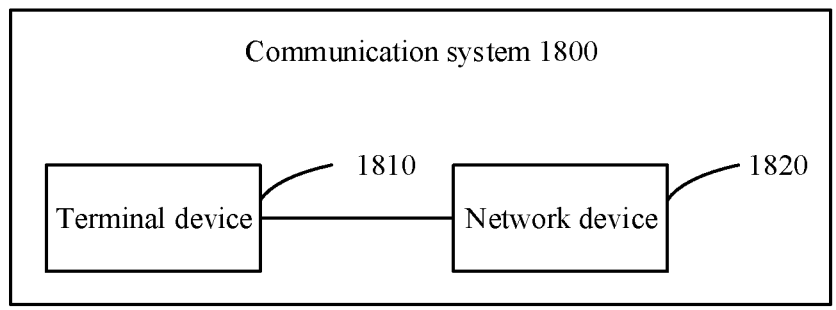
FIG. 18 illustrates a schematic block diagram of a communication system according to embodiments of the disclosure.

FIG. 18 illustrates a schematic block diagram of a communication system 1800 according to embodiments of the disclosure. As illustrated in FIG. 18, the communication system 1800 includes a terminal device 1810 and a network device 1820.

The terminal device 1810 may be configured to realize corresponding functions realized by a terminal device in any of the methods above, and the network device 1820 may be configured to realize corresponding functions realized by a network device in any of the methods above, which will not be elaborated here for simplicity.

It is to be understood that a processor in embodiments of the disclosure may be an integrated circuit chip and has a signal processing capability. During implementation, each action of the method embodiments may be completed by an integrated logic circuit in hardware in the processor or instructions in a software form. The processor may be a general-purpose processor, a digital signal processor (DSP), an application specific integrated circuit (ASIC), a field programmable gate array (FPGA) or other programmable logical devices, a discrete gate or transistor logical device, a discrete hardware component, etc. Each method, action and logic block disclosed in the embodiments of the disclosure may be implemented or executed by the processor. The general-purpose processor may be a microprocessor or the processor may also be any conventional processor and the like. The actions of the method disclosed in combination with the embodiments of the disclosure may be directly embodied to be executed and completed by a hardware decoding processor or executed and completed by a combination of hardware and software modules in the decoding processor. The software module may be located in a mature storage medium in the field such as a random access memory (RAM), a flash memory, a read-only memory (ROM), a programmable ROM (PROM), an electrically erasable PROM (EEPROM) or a register. The storage medium is located in a memory, and the processor reads information in the memory and completes the actions of the methods in combination with hardware.

It can be understood that the memory in embodiments of the disclosure may be a volatile memory or a nonvolatile memory, or may include both a volatile and nonvolatile memories. The nonvolatile memory may be a ROM, a PROM, an erasable PROM (EPROM), an EEPROM or a flash memory. The volatile memory may be a RAM, and is used as an external cache. It is to be explained, in an exemplary but not limiting manner, that RAMs in various forms may be used, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It is to be noted that the memory in a system and method described in the disclosure is intended to include, but not limited to, memories of these and any other proper types.

It is to be understood that the memories are described for exemplary bur not limiting explanation. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

In embodiments of the disclosure, also provided is a computer-readable storage medium for storing a computer program.

The computer-readable storage medium may be applied to a network device in the embodiments of the disclosure, and the computer program enables a computer to execute corresponding processes implemented by the network device in any of the methods according to the embodiments of the disclosure, which will not be elaborated here for simplicity.

The computer-readable storage medium may be applied to a mobile terminal/terminal device in the embodiments of the disclosure, and the computer program enables a computer to execute corresponding process implemented by the mobile terminal/terminal device in any of the methods according to the embodiments of the disclosure, which will not be elaborated here for simplicity.

In embodiments of the disclosure, further provided is a computer program product, including computer program instructions.

The computer program product may be applied to a network device in the embodiments of the disclosure, and the computer program instruction enables a computer to execute corresponding processes implemented by the network device in any of the methods according to the embodiments of the disclosure, which will not be elaborated here for simplicity.

The computer program product may be applied to a mobile terminal/terminal device in the embodiments of the disclosure, and the computer program instructions enable the computer to execute corresponding processes implemented by the mobile terminal/terminal device in any of the methods according to the embodiments of the disclosure, which will not be elaborated here for simplicity.

In embodiments of the disclosure, further provided is a computer program.

The computer program may be applied to a network device in the embodiments of the disclosure, and the computer program runs in a computer to enable the computer to execute corresponding processes implemented by the network device in any of the methods according to the embodiments of the disclosure, which will not be elaborated here for simplicity.

The computer program may be applied to a mobile terminal/terminal device in the embodiments of the disclosure, and the computer program runs in the computer to enable the computer to execute corresponding processes implemented by the mobile terminal/terminal device in any of the methods according to the embodiments of the disclosure, which will not be elaborated here for simplicity.

Those of ordinary skill in the art should realize that the units and algorithm actions of each example described in combination with the embodiments disclosed in the disclosure may be implemented by electronic hardware or a combination of computer software and electronic hardware. Whether to embody these functions in a hardware or software manner depends on specific applications and design constraints of the technical solutions. Professionals may realize the described functions for each specific application by different approaches, but such realization shall not be considered as departing from the scope of the application.

Those skilled in the art may clearly know that specific working processes of the systems, devices and units described above may refer to the corresponding processes in the method embodiments and will not be elaborated herein for convenience and brevity.

In some embodiments provided by the disclosure, it is to be understood that the disclosed systems, devices and methods may be implemented in another manner. For example, the device embodiments described above are only schematic. For example, division of the units is only division in logic functions, and units may be divided in other ways during practical implementation. For example, multiple units or components may be combined or integrated into another system, or some characteristics may be neglected or not executed. In addition, mutual coupling or direct coupling or communication connection discussed may be indirect coupling or communication connection, implemented through some interfaces, devices or units, and may be electrical, mechanical or in other forms.

The units described as separate parts may or may not be physically separated. Parts displayed as units may or may not be physical units, that is to say, they may be located in the same place, or may also be distributed to multiple network units. Some or all of the units may be selected to achieve the purpose of the solutions of the embodiments according to a practical requirement.

In addition, each functional unit in each embodiment of the application may be integrated into a processing unit, or each unit may physically exist independently, or two or more units may be integrated into one unit.

When realized in form of a software functional unit and sold or used as an independent product, the function may also be stored in a computer-readable storage medium. Based on such an understanding, the technical solutions of the disclosure substantially or in parts making contributions to the related art or part of the technical solutions may be embodied in form of a software product. The computer software product is stored in a storage medium, and includes instructions to enable a computer device (which may be a personal computer, a server, a network device or the like) to execute all or some of the actions of any of the methods according to the embodiments of the application. The above-mentioned storage medium includes various media capable of storing program codes such as a USB flash disk, a mobile hard disk, a ROM, a RAM, a magnetic disk or an optical disk.

The above are only detailed description of the disclosure and are not intended to limit the scope of protection of the application. Any variations or replacements apparent to those skilled in the art within the technical scope disclosed by the disclosure shall fall within the scope of protection of the application. Therefore, the scope of protection of the application shall be subject to the scope of protection of the claims.

The invention claimed is:

1. A method for session management, wherein a terminal device has established a packet data network (PDN) connection in a $4^{th}$ generation (4G) network, and after the terminal device moves from the 4G network to a $5^{th}$ generation (5G) network, the method comprises:
sending, by the terminal device, first information to a first network device, wherein the first information is used for requesting for modifying a protocol data unit (PDU) session corresponding to the PDN connection; and
receiving, by the terminal device, second information from the first network device, wherein the second information is used for indicating that the request, initiated by the terminal device, for modifying the PDU session is accepted, and the second information comprises first indication information,
wherein the first indication information indicates that the PDU session supports multi-access (MA),
wherein the PDU session supporting the MA, is able to implement data transmission with a 3rd generation partnership project (3GPP) network and a non-3GPP network simultaneously.

2. The method of claim 1, wherein the first information comprises second indication information for indicating that the terminal device has a capability of supporting an MA PDU session.

3. The method of claim 1, further comprising:
determining, by the terminal device, according to whether the PDU session supports the MA, whether to initiate creation of an MA PDU session through the non-3GPP network.

4. The method of claim 3, wherein determining, by the terminal device, according to whether the PDU session supports the MA, whether to initiate creation of the MA PDU session through the non-3GPP network comprises:
when the PDU session supports the MA, determining, by the terminal device, to initiate creation of the MA PDU session through the non-3GPP network; or
when the PDU session does not support the MA, determining, by the terminal device, not to initiate creation of the MA PDU session through the non-3GPP network.

5. A method for session management, wherein a terminal device has established a packet data network (PDN) connection in a $4^{th}$-generation (4G) network, and after the terminal device moves from the 4G network to a $5^{th}$-generation (5G) network, the method comprises:
receiving, by the first network device, first information from the terminal device, wherein the first information is used for requesting for modifying a protocol data unit (PDU) session corresponding to the PDN connection; and
sending, by a first network device, second information to the terminal device, wherein the second information is used for indicating that the request, initiated by the terminal device, for modifying the PDU session is accepted, the second information comprises the first indication information, and the first indication information indicates that the PDU session supports multi-access (MA),
and wherein the PDU session supporting the MA, is able to implement data transmission with a 3rd generation partnership project (3GPP) network and a non-3GPP network simultaneously.

6. The method of claim 5, wherein the first information comprises second indication information for indicating that the terminal device has a capability of supporting an MA PDU session.

7. The method of claim 5, before sending, by the first network device, the second information to the terminal device, the method further comprising:
sending, by the first network device, a context update request for the terminal device to a second network device; and
receiving, by the first network device, a context update response for the terminal device from the second network device, wherein the context update response comprises the first indication information.

8. The method of claim 6, before sending, by the first network device, the second information to the terminal device, the method further comprising:
sending, by the first network device, a context update request for the terminal device to a second network device, wherein the context update request comprises second indication information; and
receiving, by the first network device, a context update response for the terminal device from the second network device, wherein the context update response comprises the first indication information.

9. A terminal device, comprising a transceiver, a processor, and a memory, wherein the terminal device has established a packet data network (PDN) connection in a $4^{th}$-generation (4G) network, and after the terminal device moves from the 4G network to a $5^{th}$-generation (5G) network, the transceiver is configured to:
send first information to a first network device, wherein the first information is used for requesting for modifying a protocol data unit (PDU) session corresponding to the PDN connection; and
receive second information from the first network device, wherein the second information is used for indicating that the request, initiated by the terminal device, for modifying the PDU session is accepted, the second information comprises first indication information, and the first indication information indicates that the PDU session supports multi-access (MA), and the PDU session, supporting the MA, is able to implement data transmission with a 3rd generation partnership project (3GPP) network and a non-3GPP network simultaneously.

10. The terminal device of claim 9, wherein the first information comprises second indication information for indicating that the terminal device has a capability of supporting an MA PDU session.

11. The terminal device of claim 9, further comprising:
a processor, configured to determine, according to whether the PDU session supports the MA, whether to initiate creation of an MA PDU session through the non-3GPP network.

12. The terminal device of claim 11, wherein in determining, according to whether the PDU session supports the MA, whether to initiate creation of the MA PDU session through the non-3GPP network, the processor is configured to:
when the PDU session supports the MA, determine to initiate creation of the MA PDU session through the non-3GPP network; or
when the PDU session does not support the MA, determine not to initiate creation of the MA PDU session through the non-3GPP network.

13. A network device, comprising: a transceiver, a processor, and a memory, wherein a terminal device has established a packet data network (PDN) connection in a $4^{th}$-generation (4G) network, and after the terminal device moves from the 4G network to a $5^{th}$-generation (5G) network, the transceiver is configured to:
receive first information from the terminal device, wherein the first information is used for requesting for modifying a protocol data unit (PDU) session corresponding to the PDN connection; and
send second information to the terminal device, wherein the second information is used for indicating that the request, initiated by the terminal device, for modifying the PDU session is accepted, the second information comprises the first indication information, and the first indication information indicates that the PDU session supports multi-access (MA), and the PDU session, supporting the MA, is able to implement data transmission with a 3rd generation partnership project (3GPP) network and a non-3GPP network simultaneously.

14. The network device of claim 13, wherein the first information comprises second indication information for indicating that the terminal device has a capability of supporting an MA PDU session.

15. The network device of claim 13, wherein, before sending the second information to the terminal device, the transceiver is further configured to:
- send a context update request for the terminal device to a second network device; and
- receive a context update response for the terminal device from the second network device, wherein the context update response comprises the first indication information.

16. The network device of claim 14, wherein, before sending the second information to the terminal device, the transceiver is further configured to:
- send a context update request for the terminal device to the second network device, the context update request comprising the second indication information; and
- receive a context update response for the terminal device from the second network device, wherein the context update response comprises the first indication information.

* * * * *